United States Patent [19]

Neary

[11] Patent Number: 4,649,862
[45] Date of Patent: Mar. 17, 1987

[54] SANITIZING APPARATUS FOR PET LITTER BOX

[76] Inventor: John F. Neary, 7450-34th St. S., St. Petersburg, Fla. 33711

[21] Appl. No.: 771,519

[22] Filed: Aug. 30, 1985

[51] Int. Cl.⁴ .............................................. A01K 29/00
[52] U.S. Cl. .......................................... 119/1; 4/111.5
[58] Field of Search ............... 119/1, 19; 4/111.1, 4/111.2, 111.6, 111.5, 453

[56] References Cited

U.S. PATENT DOCUMENTS

| | | | |
|---|---|---|---|
| 3,455,277 | 7/1969 | Edwards | 119/1 |
| 3,566,838 | 3/1971 | Edwards | 119/1 |
| 4,313,234 | 2/1982 | Steward | 4/111.6 |
| 4,332,214 | 6/1982 | Cunningham | 119/1 |
| 4,546,727 | 10/1985 | Andersen | 119/1 |

Primary Examiner—Gene Mancene
Assistant Examiner—John G. Weiss
Attorney, Agent, or Firm—Pettis & McDonald

[57] ABSTRACT

A sanitizing unit for use with a pet litter box includes a panel receivable within the litter box to support the particulate litter material and includes structure for applying heat to the panel and controlling the temperature and time of the heating to destroy bacteria carried by the waste deposited upon the litter material.

17 Claims, 5 Drawing Figures

SANITIZING APPARATUS FOR PET LITTER BOX

FIELD OF THE INVENTION

This invention relates generally to the field of disposal apparatus for pet body waste. More particularly, it relates to litter boxes used for collecting pet waste. Still more particularly it relates to apparatus for sanitizing such litter boxes.

BACKGROUND OF THE INVENTION

Pet litter boxes have long been used for collecting waste from household pets, such as cats and, sometimes dogs that are kept indoors. Such litter boxes generally comprise a container holding a quantity of sand or absorbent particles of a dried clay, such as fuller's earth. Such absorbent materials absorb and hold the urine deposited by the pet and serve to desiccate and partially absorb odor from feces deposited by the using pet.

The conventional litter box has suffered from several disadvantages. First, the particulate litter material used therein has a limited capacity for liquid absorption. Accordingly, it is necessary to empty the soiled litter material and replace it with fresh litter at regular intervals. Additionally, the feces and urine may contain or develop various bacteria and viruses that may infect the pet or be distributed throughout the house by the pet using the litter Various approaches have been tried to improve the necessary indoor waste disposal. These have included placing a partially enclosed cover over the litter box to control odor and using various deodorizing apparatus within such an enclosed box to reduce odors. In one case it has been proposed to dispense entirely with the litter with the pet depositing its waste upon a solid tray, such as metal, which is then dumped into a container below the tray for drying and evaporation. However, none of these approaches has provided the benefit of the use of particulate litter while providing for extended use of that litter under relatively sanitary conditions.

SUMMARY OF THE INVENTION

It is an object of the present invention to provide apparatus for sanitizing a pet litter box. It is an additional object of this invention to provide such apparatus that reduces the quantity of bacteria that are present in the litter material that has been used by a pet. It is a further object of this invention to provide such apparatus that heats and dries the litter material to destroy bacteria residing upon a particulate material.

According to this invention there is provided a sanitizing unit for use with a pet litter box, which unit includes an elongated panel receivable within the litter box with the upward facing surface of the panel supporting particulate litter material placed thereupon, apparatus for applying heat to the panel and apparatus for selectively controlling the heat applied to the panel so that the temperature of the litter materials supported thereupon is raised to a predetermined level and maintained at that level for a time sufficient to destroy bacteria deposited thereupon.

BRIEF DESCRIPTION OF THE DRAWINGS

A particularly embodiment of the pet litter sanitizing unit of this invention will be described in detail below in which.

DETAILED DESCRIPTION OF A PREFERRED EMBODIMENT

Figure 2:
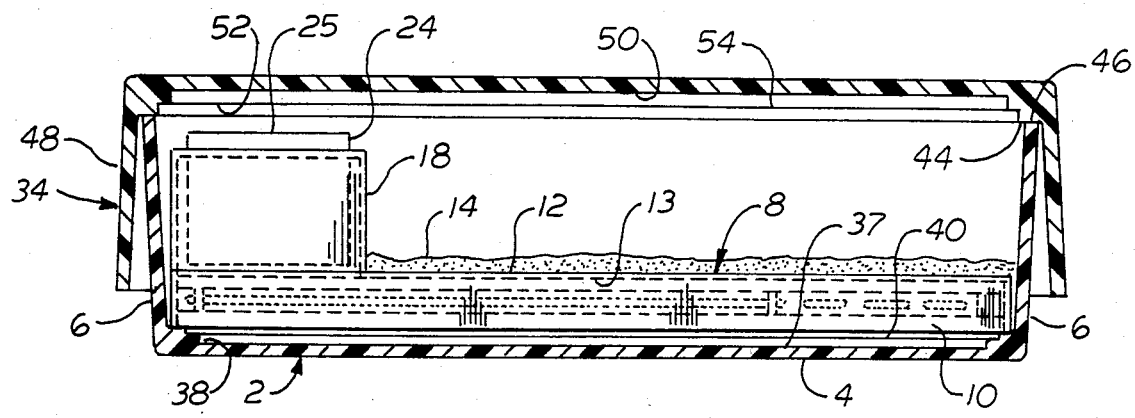
FIG. 2 is a sectional elevational view of the apparatus of FIG. 1, taken along line 2—2 but with the cover illustrated in a closed position.
Figure 3:
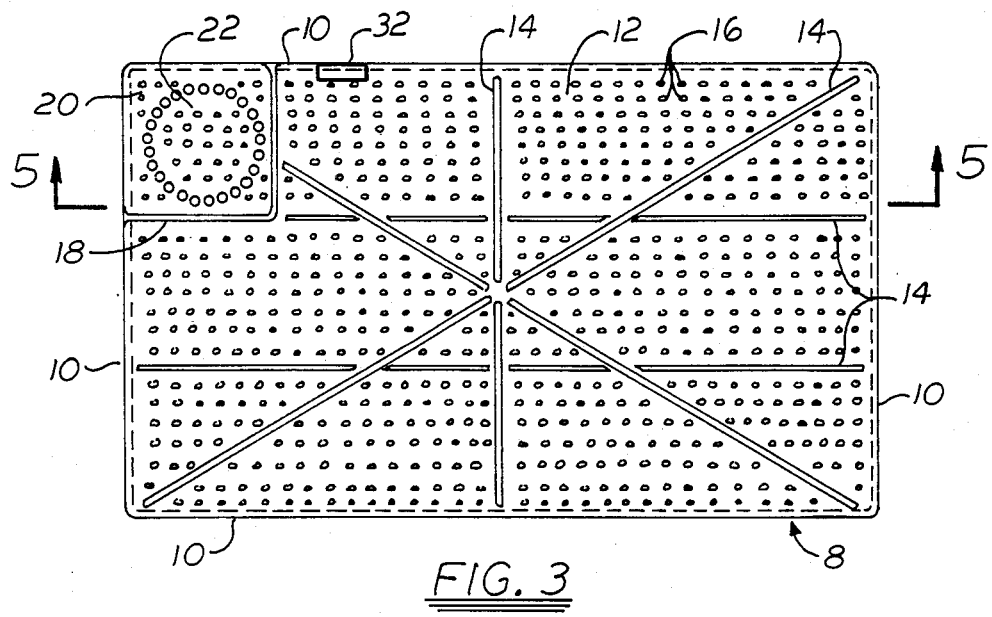
FIG. 3 is a top plan view of the heating panel of the apparatus of FIG. 1.
Figure 4:
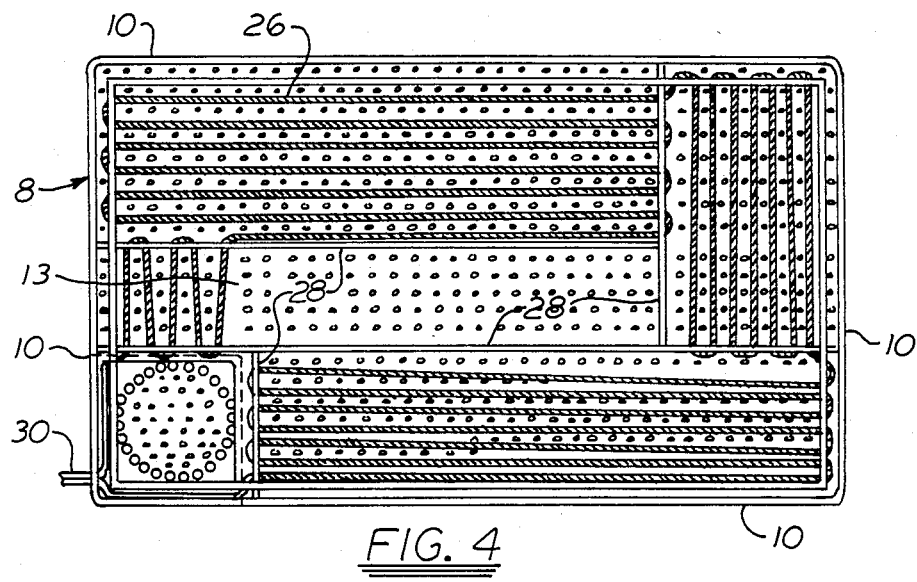
FIG. 4 is a bottom plan view of the panel of FIG. 3.
Figure 5:
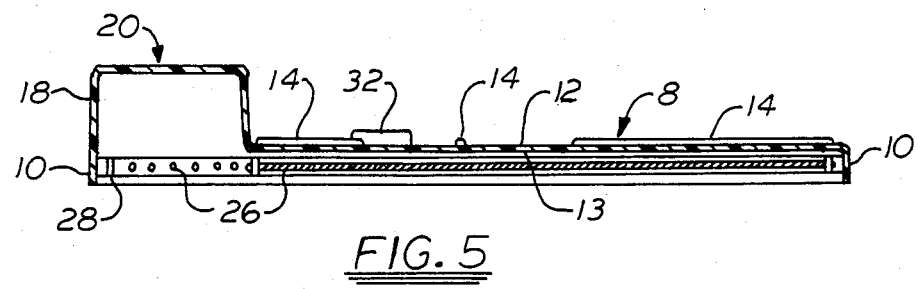
FIG. 5 is a side sectional view of the panel of FIG. 3 taken along line 5—5.

A particularly preferred embodiment of the pet litter sanitizing apparatus of this invention is illustrated in FIGS. 1 through 5. This sanitizing apparatus is used in connection with a pet litter box 2 which has a bottom 4 and sides 6 extending upwardly therefrom. Received within the litter box is an elongated panel 8, which is also illustrated in FIGS. 3 through 5. This panel preferably is generally rectangular in plan view and is provided with means for supporting the panel above and generally parallel to the box bottom, which means may conventionally be downwardly extending side portions 10 of the panel. As is best illustrated in FIG. 2, the upwardly facing surface 12 of the panel 8 thus may support substantially all of the conventional particulate litter material, such as dried clay particles, that are placed upon the panel 8.

Figure 1:
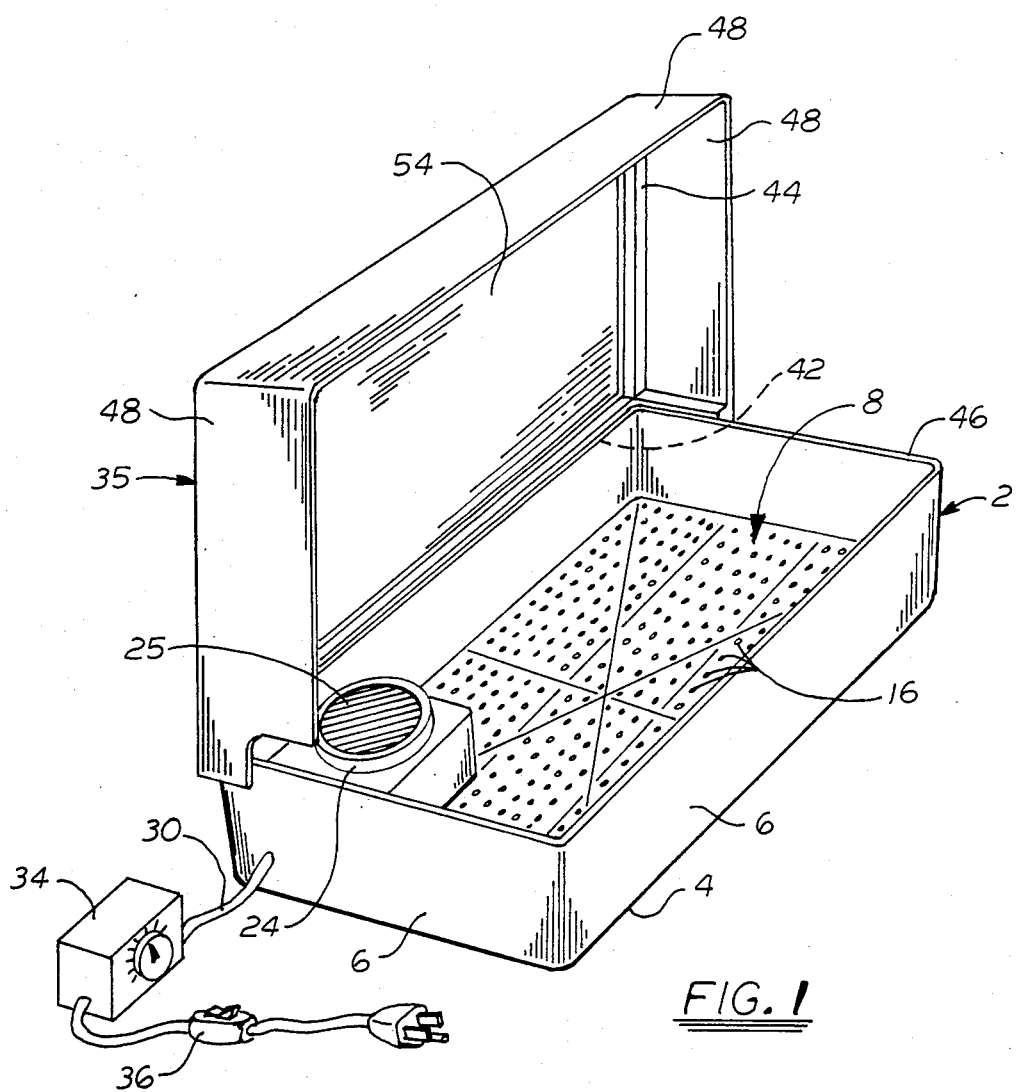
FIG. 1 is a perspective view of the apparatus of this invention, with a covering lid in an open position.

The panel 8 preferably is formed of a synthetic resin, which suitably may be Uniroyal R-59 plastic. The panel 8 is illustrated in greatest detail in FIGS. 3 through 5. As shown in FIG. 3, the panel 8 may be provided with a plurality of reinforcing ribs 14 on its upwardly facing surface 12 to provide additional stiffness. Additionally, the upwardly facing surface 12 and its obverse downwardly facing surface 13 of the panel 8 are provided with a large number of holes 16 extending completely through that upwardly facing surface 12. The size of these holes 16 is exaggerated in the drawings for the sake of illustration, but each has an area smaller than the average cross-sectional area of the litter material particles and may suitably be on the order of 1/32 inch diameter and may suitably be spaced on approximately ⅛ inch centers, preferably extending across substantially the entire upwardly facing portion 12 of the panel 8. This upwardly facing portion of this foraminous panel 8 also includes a raised portion 18, which suitably may be positioned in one corner of the panel as shown in FIG. 3. In the upward facing surface 20 of this raised portion 18 there is provided, suitably by a closely spaced pattern of holes, a removable portion 22 of that panel 20. This removable portion 22 may suitably be removed by breaking the thin webs that connect the center portion 22 with the surrounding portion of that raised panel 20. Once the removable portion 22 has been so removed, conventional blower means 24 as shown in FIGS. 1 and 2 may be inserted for use in a manner to be described below.

Below the downwardly facing surface 13 of the panel 8 there is supported a heating element 26, which may be of conventional construction, such as a silicone insulated resistance wire. One suitable configuration for the heating element 26 may be that shown in the bottom plan view of FIG. 4. As shown in that figure, the heating element wires 26 extend in a sinuous pattern under most of the panel 8, but with a free area beneath the raised portion 18. Preferably, the center area of the panel 8 may also be free of the heating element 26 to avoid excessive heat buildup in the center of that panel, although other suitable configurations of the heating element could obviate that provision. The heating element 26 may suitably be supported by a plurality of webs extending downwardly from the underside of the upward facing portion 12 of the panel 8, in a manner shown in FIG. 4. These reinforcing webs 28 may thus provide not only additional rigidity for the panel 8 but also support for the heating element 26.

The heating element 26 preferably is connected to the line cord 30 (FIG. 4) through thermostatic means 32 in a conventional manner. Such thermostatic means may conveniently be of the nature of a Klixon thermoswitch and may be operatively connected to the panel 8 and of suitable operating characteristics to maintain the panel below 180 degrees F. while maintaining the litter material placed thereupon at a temperature of at least 145 degrees F.

This apparatus may be provided, in its line cord 30, with a timer 34 to control the duration of activation of the heating element 26. A conventional switch 36 may also be provided in that line cord for full control over the operation of the electrical apparatus, including independent or simultaneous operation of the blower 24 and the heating element 26.

While it is to be understood that the apparatus of this invention, specifically the perforated heating panel 8 may be used satisfactorily in almost any conventional form of litter box, the particularly preferred configuration shown in FIGS. 1 and 2 provides yet additional benefits. In this embodiment, which may or may not include a cover 35, the heating panel 8 is configured and dimensioned to be received closely within the bottom of the litter box pan 2.

The configuration of this pan 2 is shown more clearly in the sectional view of FIG. 2. This view illustrates a section through the center of such a pan 2 with a lid 34 in the closed position, as distinguished from the open position illustrated in FIG. 1.

As previously described, this preferred embodiment of the litter pan 2 includes an exterior bottom panel 4 and substantially continuous side portions 6 extending upwardly therefrom. As shown in the sectional view of FIG. 2 the bottom of the litter box 2 includes within not only the inside bottom portion 36 but also, preferably, a lip 38 extending around the periphery of that bottom portion 36 supporting a second panel 40 facing and spaced above the inside bottom portion 37 to form a insulating space between that insulating panel 40 and the inside bottom portion 37. While the litter box 2 and its cover 34 preferably are formed of a suitable rigid plastic material, this insulating panel may preferably be formed of a reflective material such as aluminum.

The lid 34, shown in FIGS. 1 and 2, may be formed of any suitable rigid plastic material known to those skilled in the art and preferably is configured and dimensioned to be received over the uppermost portions of the sides 6 of the litter pan 2, generally as shown in the section of FIG. 2. Preferably, this lide 34 is connected to litter pan 2 by a conventional hinge structure 42, which may be formed of plastic or metal. This lid 34 may suitably be provided with a lip 44 that may be received against and rest upon the uppermost extremities 46 of the pan 2. The lid or cover 34 preferably includes side portions 48 which, when the cover is in a closed position, extend downwardly overlapping the side portions 6 of the litter pan 2. This cover 34 preferably includes not only an inside top portion 50 but preferably also a lip 52 extending around the periphery of that inside top portion. This lip 52 may thus support panel 54, which may suitably be made of aluminum or similar reflective material, in a position facing and spaced from that inside top portion 50 to an insulating space between the panel 54 and the upper inside top portion 50. This heat reflecting panel 54 is preferably attached to the cover 34, such as by its engagement with the lip 52, to form an insulating dead air space between the panel 54 and the cover inside top portion 50. Of course, some of the same benefits could be obtained from such a heat reflecting panel 54 even if there were no dead air space between that panel and the cover inside top portion 50.

With the structure of the preferred embodiment generally described in the foregoing sections, the manner of operation of such a preferred embodiment may be as follows: With the foraminous heating panel 8 positioned in the bottom of the litter box 2, preferably covering substantially the entire bottom of that litter box, conventional particulate litter material may then be placed over the top of that panel 8. Preferably a relatively thin layer of such particulate litter material 14, on the order of ½ inch in thickness, may be used with this invention.

After an animal has used the litter box, discharging its urine and feces upon the litter material, the apparatus may be activated. While it is not necessary to include the cover 34 for satisfactory operation, or to close it as shown in FIG. 2, such closing of the cover may serve to enhance the operation of the apparatus. Thus, with the cover 34 either present or not or closed or opened, the sanitizing unit may then be activated. It may be activated manually by the on-off switch 36 or at preset intervals, such as by the use of the timer 34, the unit being plugged into a household electrical outlet. When the unit is energized, the heating element is then heated to its desired temperature, as controlled by the thermostat 32. This thermostat, being operatively connected to the panel 8, may thus control the heating element 26 and thereby control the application of heat to the panel based upon the temperature of the portion of the panel to which the thermostat 32 is attached. Because the heating element 26 extends adjacent and substantially along each of the sides of the panel 8, energizing that heating element 26 serves to supply heat to substantially the entire litter material supporting portion of the panel 8. Heat from this heating element 26 is passed through the panel 8 to the litter material supported upon the upwardly facing surface of panel 8 both by conduction and by convection of the air through the apertures 16 in that foraminous panel 8. Because the area of each of the aperture 16 through the panel is smaller than the average cross-sectional area of the particles of litter material, these apertures permit the passage of air while generally blocking any downward passage of litter material particles.

The heating element 26 remains energized, under the control of the thermostat 32 and, if included, the timer 34 such that the temperature of the litter material supported upon the panel 8 is raised to a predetermined level, suitably 145 to 155 degrees, and maintained at that level for a period of time, which may be as short as 30 minutes, sufficient to destroy bacteria carried by the liquid and solid waste deposited thereupon. The total time of energization may be as little as one hour. Preferably, this sanitizing procedure is carried out on a daily basis to control such bacteria.

If included, the blower 24 may also be energized independently of or at the same time as the heating element 26, to urge the air from one side of the panel 8 to the other side. Preferably, the blower is operated such that the air intake 25 is positioned above the litter supporting surface of the panel so that air from above the panel may be drawn in by the blower and introduced under pressure into the space between the downwardly facing surface 13 of the panel 8 and the bottom of the litter box. This pressurized air will then pass through the apertures 16 in the panel 8 and upwardly through the litter material supported by that panel, thus encouraging the drying, by both the air movement and the heat convection, of both the litter and any liquid or solid waste material deposited thereupon.

The heat reflecting panel 40 supported above the inside lower portion of the litter box 36 serves to reflect heat from the heating element upwardly to increase the heating of the litter material 14 and to reduce the heat going to the bottom surface of the litter box 2 and the floor or other supporting surface upon which it is placed. Where the cover 34 is used and closed as illustrated in the sectional view of FIG. 2, such enclosure of a space above the litter further serves to concentrate the heat for drying the litter material. Likewise, where the blower 24 is used, the closing of the cover will further encourage a recirculation of the air above and below and through the litter material. With this cover in the closed position the heat reflecting panel 54 will yet further intensify the heat applied to the litter material and insulate the broad expanse of the cover from a portion of that heat. The circulation of the air from above the litter under the panel 8 and then up through the litter material again, either by convection or by action of the blower 24, also serves to reduce the odor by virtue of the absorptive characteristics of the particulate litter material.

At the end of the sanitizing cycle the heating element 26, and the blower 24 if installed, are deenergized either manually or by action of a timer 34, and the litter material is again ready for use by the pet. At this point the litter material has been substantially dried with a substantial quantity of the bacteria from waste material having been killed by the heating process. It is highly preferable that this heating process be carried out at a temperature for a time controlled to be sufficient to destroy the bacteria without the use of excessive heat. This is both to facilitate use of the apparatus with conventional plastic litter boxes without substantial danger of either fire or melting and also to protect the pet against injury or serious discomfort if the pet should enter the litter box to use it while the sanitizing apparatus is energized. As noted above, raising and maintaining the temperature of the litter at about 145 to 155 degrees F. for at least one-half hour has been found to be a satisfactory treatment. Of course, other temperature and time combinations readily discernible to those skilled in the art could also be equally suitable so long as they present no significant danger to the pet or to the home owner.

While the foregoing describes a particularly preferred embodiment of the sanitizing unit of this invention, it is to be understood that this description is illustrative only of the principles of the invention and is not to be considered limitative thereof. Accordingly, because numerous variations and modifications of this apparatus, all within the scope of the invention, will readily occur to those skilled in the art, the scope of this invention is to be limited solely by the claims appended hereto.

What is claimed is:

1. A sanitizing unit for use with a pet litter box having a bottom and sides extending upwardly therefrom for containing particulate litter material, said sanitizing unit comprising
   an elongated panel receivable within said litter box;
   means for supporting said panel generally parallel to said box bottom such that the upward facing surface of said panel will support particulate litter material placed thereupon;
   means for applying heat to said panel, whereby liquid and solid waste material deposited by an animal upon the particulate litter material supported by the panel may be heated and dried; and
   means for both selectively controlling said application of heat to said panel such that the temperatures of said panel and/of the litter material supported thereupon are raised to predetermined levels and maintained at those levels for a time sufficient to destroy bacteria residing upon said panel and upon the particulate litter material and carried by the liquid and solid waste deposited thereupon and also for thereafter discontinuing said application of heat.

2. The sanitizing unit of claim 1 wherein said panel is dimensioned to cover substantially the entire bottom of said litter box such that substantially all of the particulate litter material contained within said litter box is supported upon or adjacent said panel for heating thereby.

3. The sanitizing unit of claim 1 wherein said panel includes side portions engaging said litter box to substantially exclude the particulate litter material supported upon the panel from the area beneath the panel.

4. The sanitizing unit of claim 1 wherein said heat applying means comprises resistive heating element means positioned adjacent and below the downward facing surface of said panel, whereby heat from the heating element means is passed through the panel to the litter supported thereupon.

5. The sanitizing unit of claim 4 wherein said panel is generally rectangular in plan with two sets of mutually opposing sides and wherein said heating element means extends adjacent and substantially along each of said panel sides such that operation of said heating element means serves to apply heat to substantially the entire litter material supporting portion of said panel.

6. The sanitizing unit of claim 1 wherein said heat controlling means comprises thermostat means operatively connected to said panel for controlling said application of heat to said panel based upon the temperature of a portion of said panel.

7. The sanitizing unit of claim 6 wherein heat controlling means further comprises timer means for controlling the length of time that said heat is applied to said panel.

8. The sanitizing unit of claim 1 wherein said panel comprises a foraminous member in which the area of each of the apertures through said litter material supporting surface is smaller than the average cross sectional area of the particles of said litter material, whereby the apertures will permit the passage of air therethrough while generally blocking passage of litter material particles.

9. The sanitizing unit of claim 8 further comprising means for supporting said panel with the downward facing surface thereof spaced above the bottom of the litter box and for substantially excluding said litter material from the area beneath said panel.

10. The sanitizing unit of claim 9 wherein
said panel includes a removable portion to provide, upon its removal, an opening through said panel; and
said unit further comprises air blower means engageable with said panel opening to urge air from one side of said panel to the other side.

11. The sanitizing unit of claim 10 wherein said panel supporting and litter material excluding means substantially encloses the space between the downwardly facing surface of said panel and the bottom of said litter box and wherein the air intake of said air blower means extends above said litter supporting surface of said panel, whereby air from above the panel and litter material may be drawn in by the blower and introduced under pressure into the space between the panel and the bottom of the litter box for subsequent passage through the apertures extending through the panel and through the litter material supported by the panel.

12. The sanitizing unit of claim 1 further comprising means for controlling operation of said blower means such that said blower means may be operated independently of operation of said heat applying means.

13. The sanitizing unit of claim 1 further comprising a cover for said litter box, and cover engaging the edges of said litter box and including a heat reflecting panel carried by said cover and positioned above the litter material of the litter box.

14. The sanitizing unit of claim 13 wherein at least a portion of the surface of said heat reflecting panel is positioned facing and spaced from the inside top portion of said cover to form an insulating space between said panel portion and said cover inside top portion.

15. The sanitizing unit of claim 14 wherein the edges of said heat reflecting panel are attached to said cover such that insulating space comprises a substantially enclosed dead air space.

16. The sanitizing unit of claim 1 further comprising a litter box having a bottom portion and continuous side portions extending upwardly therefrom and an insulating panel carried by said bottom portion and positioned facing and spaced above the inside bottom portion to form an insulating space between said insulating panel and said box inside bottom portion.

17. The sanitizing unit of claim 16 wherein the edges of said insulating panel ar attached to said bottom portion such that said insulating space comprises a substantially enclosed dead air space.

* * * * *